United States Patent
Fukuhara

(10) Patent No.: US 10,469,728 B2
(45) Date of Patent: Nov. 5, 2019

(54) IMAGING DEVICE HAVING A LENS ARRAY OF MICRO LENSES

(71) Applicant: Sony Corporation, Tokyo (JP)

(72) Inventor: Takahiro Fukuhara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 12 days.

(21) Appl. No.: 14/608,914

(22) Filed: Jan. 29, 2015

(65) Prior Publication Data
US 2015/0256736 A1    Sep. 10, 2015

(30) Foreign Application Priority Data
Mar. 5, 2014    (JP) .................................. 2014-042856

(51) Int. Cl.
| | |
|---|---|
| H04N 5/232 | (2006.01) |
| H04N 5/235 | (2006.01) |
| G02B 7/34 | (2006.01) |
| H04N 5/369 | (2011.01) |
| G02B 3/00 | (2006.01) |

(52) U.S. Cl.
CPC ........... *H04N 5/23212* (2013.01); *G02B 7/34* (2013.01); *H04N 5/2355* (2013.01); *H04N 5/3696* (2013.01); *G02B 3/0056* (2013.01)

(58) Field of Classification Search
CPC ............. H04N 5/23212; H04N 5/2355; H04N 5/3696; G02B 7/34; G02B 3/0056
See application file for complete search history.

(56) References Cited

U.S. PATENT DOCUMENTS

| | | | | |
|---|---|---|---|---|
| 6,826,363 B2* | 11/2004 | Taka | ...................... | G03B 13/00 348/345 |
| 2004/0057712 A1* | 3/2004 | Sato | ........................ | G03B 3/00 396/89 |
| 2007/0206937 A1* | 9/2007 | Kusaka | .................. | G02B 7/102 396/89 |
| 2011/0076001 A1* | 3/2011 | Iwasaki | .................. | G03B 7/099 396/114 |
| 2013/0258098 A1* | 10/2013 | Ikemoto | .................. | G01S 17/89 348/135 |
| 2014/0036134 A1* | 2/2014 | Miyatani | ............ | H04N 5/23212 348/345 |
| 2014/0063330 A1* | 3/2014 | Matsuyama | ......... | H04N 5/2356 348/352 |
| 2014/0168484 A1* | 6/2014 | Suzuki | ............... | H04N 5/23212 348/246 |

(Continued)

FOREIGN PATENT DOCUMENTS

| | | |
|---|---|---|
| JP | 2013-255301 A | 12/2013 |
| JP | 2014-29353 A | 2/2014 |

OTHER PUBLICATIONS

U.S. Appl. No. 14/608,914, filed Jan. 29, 2015, Fukuhara.
U.S. Appl. No. 14/608,778, filed Jan. 29, 2015, Fukuhara.

*Primary Examiner* — Antoinette T Spinks
(74) *Attorney, Agent, or Firm* — Oblon, McClelland, Maier & Neustadt, L.L.P.

(57) ABSTRACT

An imaging device includes an imaging lens; an imaging element which contains object imaging pixels and focal point detection pixels; and a lens array configured by micro lenses being arranged on a two-dimensional plane, and arranged on a front surface of an imaging surface of the imaging element to be distanced therefrom.

11 Claims, 15 Drawing Sheets

(56) References Cited

U.S. PATENT DOCUMENTS

| | | | |
|---|---|---|---|
| 2015/0009352 A1* | 1/2015 | Shibagami | H04N 5/2355 348/218.1 |
| 2015/0077603 A1* | 3/2015 | Matsuzawa | H04N 5/77 348/297 |
| 2017/0187949 A1* | 6/2017 | Kim | H04N 5/23212 |
| 2017/0353679 A1* | 12/2017 | Negishi | H04N 5/23212 |
| 2017/0359539 A1* | 12/2017 | Kawabata | G02B 7/34 |

\* cited by examiner

FIG. 2

| R | G | R | G | R | G | R | G |
|---|---|---|---|---|---|---|---|
| G | B | G | B | G | B | G | B |
| R | G | R | G | R | G | R | G |
| S1 | B | S1 | B | S1 | B | S1 | B |
| R | G | R | G | R | G | R | G |
| S2 | B | S2 | B | S2 | B | S2 | B |
| R | G | R | G | R | G | R | G |
| G | B | G | B | G | B | G | B |

Rows 1–2: 203
Rows 3–4: 201
Rows 5–6: 202
Rows 7–8: 204

FIG. 4
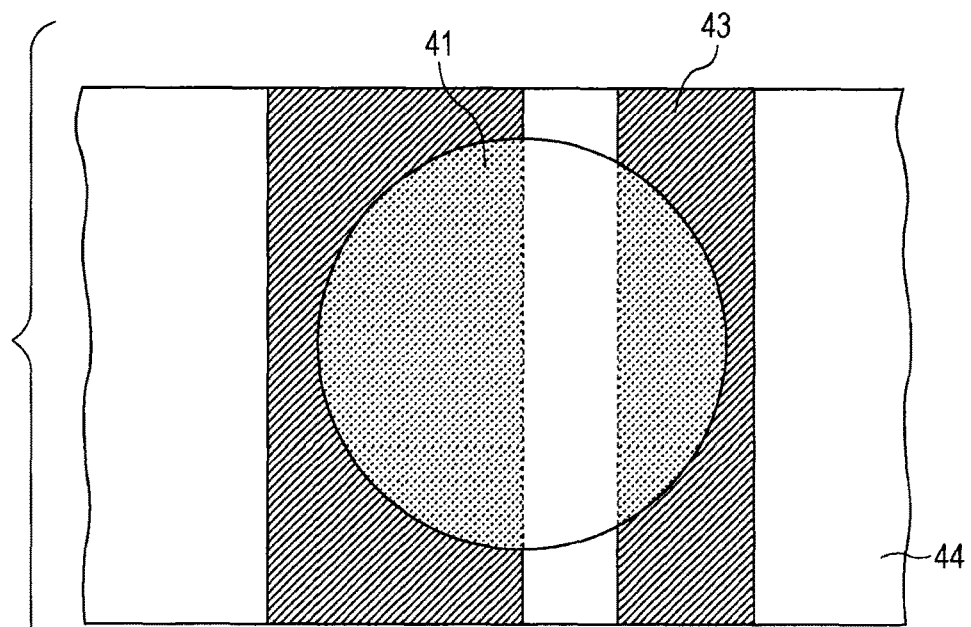
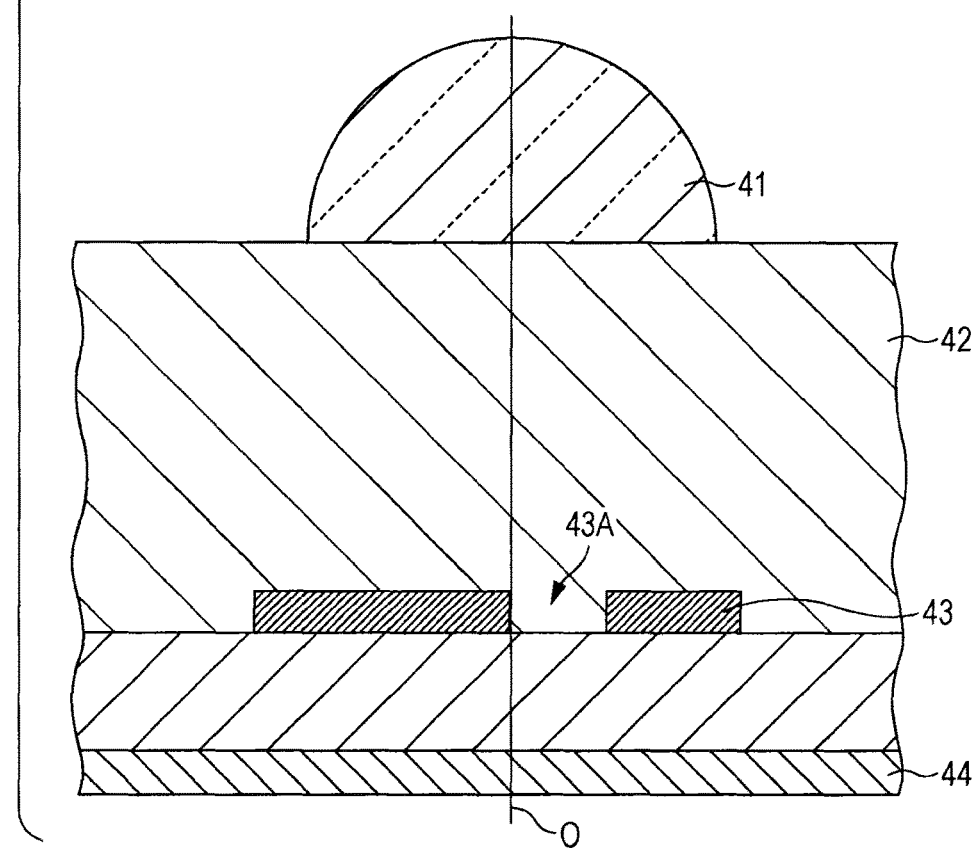

IMAGING DEVICE HAVING A LENS ARRAY OF MICRO LENSES

CROSS REFERENCE TO RELATED APPLICATIONS

This application claims the benefit of Japanese Priority Patent Application JP 2014-042856 filed Mar. 5, 2014, the entire contents of which are incorporated herein by reference.

BACKGROUND

The present technology disclosed in the present specification relates to an imaging device which images a high dynamic range image using a low dynamic range imaging element.

According to the increasing bit-depth of imaging elements (imaging sensors) and the support for high bit-depths in displays, there is progress in the adoption of high dynamic range (HDR) images. An HDR image has a contrast ratio between the maximum brightness color and the minimum brightness color of, for example, 10000:1 or greater, and can realistically represent the real world. The HDR image has merits such as being capable of realistically representing shading, being capable of simulating exposure, and being capable of representing glare.

Examples of fields to which HDR technology can be adapted include electronics and devices which use an image captured from an imaging element (complementary metal oxide semiconductor (CMOS) sensors, charge coupled device (CCD) sensors), digital still cameras, video camcorders, medical image cameras, security cameras, digital cinematic filming cameras, binocular image cameras, and displays.

Various technologies that image a high dynamic range image using a low dynamic range imaging element are proposed.

For example, an imaging device which synthesizes an HDR image from a plurality of images with different exposures is proposed (for example, refer to Japanese Unexamined Patent Application Publication No. 2013-255301). However, when a one frame HDR image is synthesized from a plurality of frames, the following problems arise.
(1) Plural frames worth of memory is necessary.
(2) Delay time caused by capturing and processing of the plurality of frames.
(3) Motion blur of a moving object.

SUMMARY

It is desirable to provide an excellent imaging device capable of imaging a high dynamic range image using a low dynamic range imaging element.

According to an embodiment of the present technology, there is provided an imaging device which includes an imaging lens; an imaging element which contains object imaging pixels and focal point detection pixels; and a lens array configured by micro lenses being arranged on a two-dimensional plane, and arranged on a front surface of an imaging surface of the imaging element to be distanced therefrom.

In the embodiment, the imaging device may further include a phase difference detection unit which detects a phase difference in signals obtained from each of a first focal point detection pixel and a second focal point detection pixel contained in the focal point detection pixels; and a lens control unit which controls a focal position of the imaging lens based on the phase difference.

In the embodiment, the imaging device may further include diaphragm opening portions which control an amount of light incident on the object imaging pixels.

In the embodiment, the imaging device may be configured to generate a plurality of images with different, exposure conditions by controlling exposure for each object imaging pixel.

In the embodiment, the imaging device may further include an image synthesizing unit which generates a high dynamic range image by combining the plurality of images with different exposure conditions.

In the embodiment, the image synthesizing unit of the imaging device may be configured to generate a high dynamic range image by combining a high exposure image and a low exposure image that are generated by the imaging element.

In the embodiment, the image synthesizing unit of the imaging device may be configured to generate a high dynamic range image by combining a high exposure image, a medium exposure image, and a low exposure image that are generated by the imaging element.

In the embodiment, the imaging device may further include an interpolation unit which, after an image is formed on the imaging element, in relation to each image with different exposure conditions, improves a resolution thereof by interpolating pixels of pixel positions of other exposure conditions using adjacent pixel values in which the exposure conditions are the same.

In the embodiment, the interpolation unit of the imaging device may be configured to increase a resolution to a same resolution as an input image by interpolating the pixels of each image with different exposure conditions.

In the embodiment, the imaging device may be configured to generate, using photoelectric conversion, a plurality of images with different exposure conditions using the object imaging pixels according to a focal position that is detected by the focal point detection pixels, and to generate a high dynamic range image by combining the plurality of images with different exposure conditions.

According to the present technology disclosed in the present specification, it is possible to provide an excellent imaging device capable of imaging a high dynamic range image using a low dynamic range imaging element.

Since the imaging device to which the present technology that is disclosed in the present specification is applied performs the detection and adjustment of the focal point and the generation of the high dynamic range image within one frame, it is possible to generate a high dynamic range image without focal position mismatching. It is possible to solve the problems with memory, delay, motion blur of a moving object, and the like when generating a high dynamic range image from a plurality of frames.

Note that, the effects described in the present specification are merely exemplary, and the effects of the present disclosure are not limited thereto. There is a case in which the present disclosure has additional effects other than those described above.

Other aims, characteristics and merits of the present technology disclosed in the present specification will become clear due to a detailed description based on the embodiment and attached drawings described later.

BRIEF DESCRIPTION OF THE DRAWINGS

FIG. 2 is a diagram illustrating an example of a pixel array in an imaging element used in an imaging unit;

FIG. 4 is a diagram illustrating the structure of a second focal point detection pixel;

DETAILED DESCRIPTION OF EMBODIMENTS

Hereinafter, embodiments of the present technology disclosed in the present specification will be described in detail with reference to the drawings.

Auto focus (AF) technology is generally implemented in recent digital cameras. For example, a focal point adjustment device in which pixels for focal point detection are embedded in the imaging element, and which performs focal position matching using a plurality of phase difference detection units that subject the imaging lens to pupil splitting is proposed (for example, refer to Japanese Unexamined Patent Application Publication No. 2014-29353).

Here, a case will be considered in which an auto focus function is applied to an imaging device (described above) which synthesizes an HDR image from a plurality of images with different exposures.

The HDR image is generated by capturing a high exposure image frame and a low exposure image frame in advance, and combining the images. When capturing each of the high exposure image frame and the low exposure image frame, the focal, point matching is performed separately. In other words, the HDR image generation is performed using a plurality of image frames, and the detection and adjustment of the focal point is performed for each image frame. In this case, when an object that moves at high speed is present in the input image, for example, regardless of the fact that the object image is originally the same, the focal positions between adjacent frames are anticipated to greatly differ between both frames.

Therefore, when the synthesis is carried out after performing the focal point matching separately for the separate frames, the high exposure image frame and the low exposure image frame, the likelihood of an HDR synthesized image that feels unnatural being generated increases due to the mismatching of the focal positions of the object images of the moving object.

Therefore, in the present technology disclosed in the present specification, a high dynamic range image without focal position mismatching is generated by performing the detection and the adjustment of the focal point and the HDR image generation within one frame.

Figure 1:
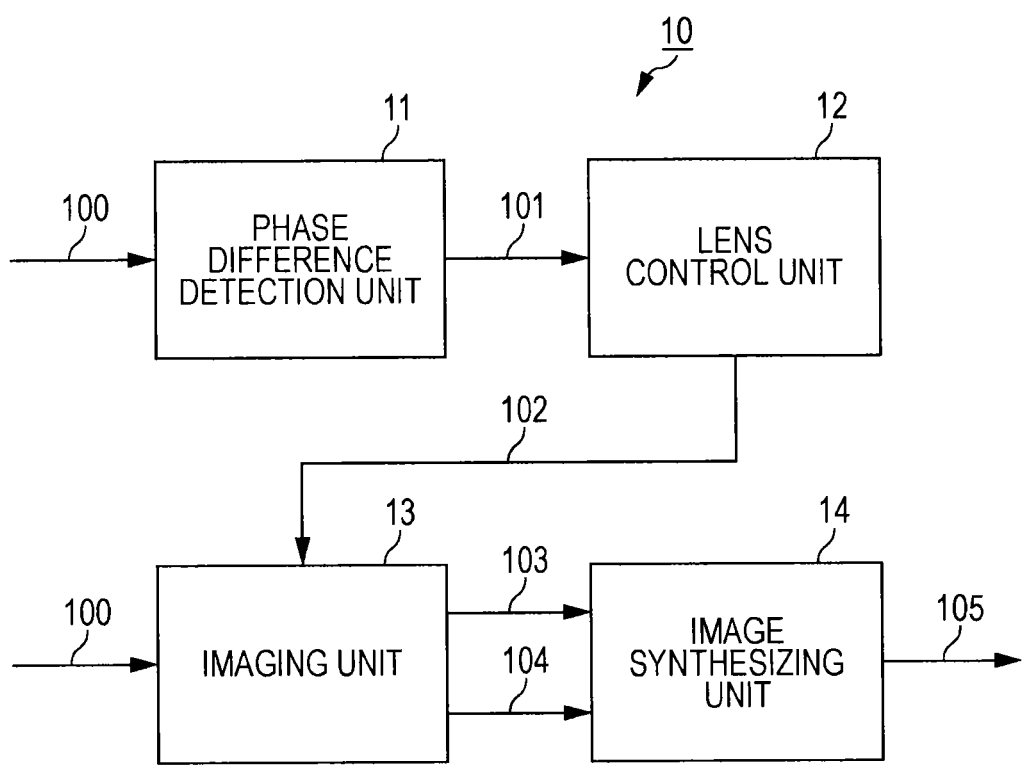
FIG. 1 is a diagram schematically illustrating the configuration of an imaging device to which the present technology disclosed in the present specification is applied.

FIG. 1 schematically illustrates the configuration of an imaging device 10 to which the present technology disclosed in the present specification is applied. The imaging device 10 that is illustrated is provided with a phase difference detection unit 11, a lens control unit 12, an imaging unit 13, and an image synthesizing unit 14.

As described later, pixels for focal point detection are embedded in the imaging element that is used by the imaging unit 13, and the pixels for focal point detection form the phase difference detection unit 11. Light of an object (an input image) 100 is incident on the imaging unit 13 and the phase difference detection unit 11.

The phase difference detection unit 11 outputs a phase difference signal 101 in relation to the input image 100. The lens control unit 12 causes an imaging lens (not shown in FIG. 1) in the imaging unit 13 to move forward and backward in the optical axis direction and performs the focal point matching based on the phase difference signal 101.

The imaging unit 13 outputs, in one imaging, one frame including a high exposure image signal 103 and a low exposure image signal 104. The image synthesizing unit 14 combines the high exposure image signal 103 and the low exposure image signal 104, and generates an HDR image 105 in one frame, that is, in one imaging.

FIG. 2 illustrates an example of a pixel array in an imaging element used in the imaging unit 13. In the example of FIG. 2, a Bayer array is used as the base, and a row in which R component detection pixels and G component detection pixels are arranged alternately and a row in which G component detection pixels and B component detection pixels are arranged alternately are repeated. R, G, and B color filters are added on top of the R, G, and B component detection pixels, respectively. However, the present technology disclosed in the present specification is not limited to a Bayer array.

As described above, pixels for focal point detection are embedded in the imaging element used by the imaging unit 13. In the example illustrated in FIG. 2, a first focal point detection pixel row 201 and a second focal point detection pixel row 202 are arranged to be interposed between ordinary imaging pixel rows 203 and 204. In the first focal point detection pixel row 201, a portion of the G component detection pixels is replaced with first focal point detection pixels S1, and in the second focal point detection pixel row 202, a portion of the G component detection pixels is replaced with second focal point detection pixels S2. The photoelectric properties of the focal point detection pixels S1 and S2 differ from those of the pixels of the R, G, and B positions. In an ordinary (general Bayer array) imaging pixel row, in relation to the total number of pixels N, the G resolution is N/2, and the R and B resolutions are N/4; however, in the first and second focal point detection pixel rows, the R, G, and B resolutions are all N/4.

Figure 3:
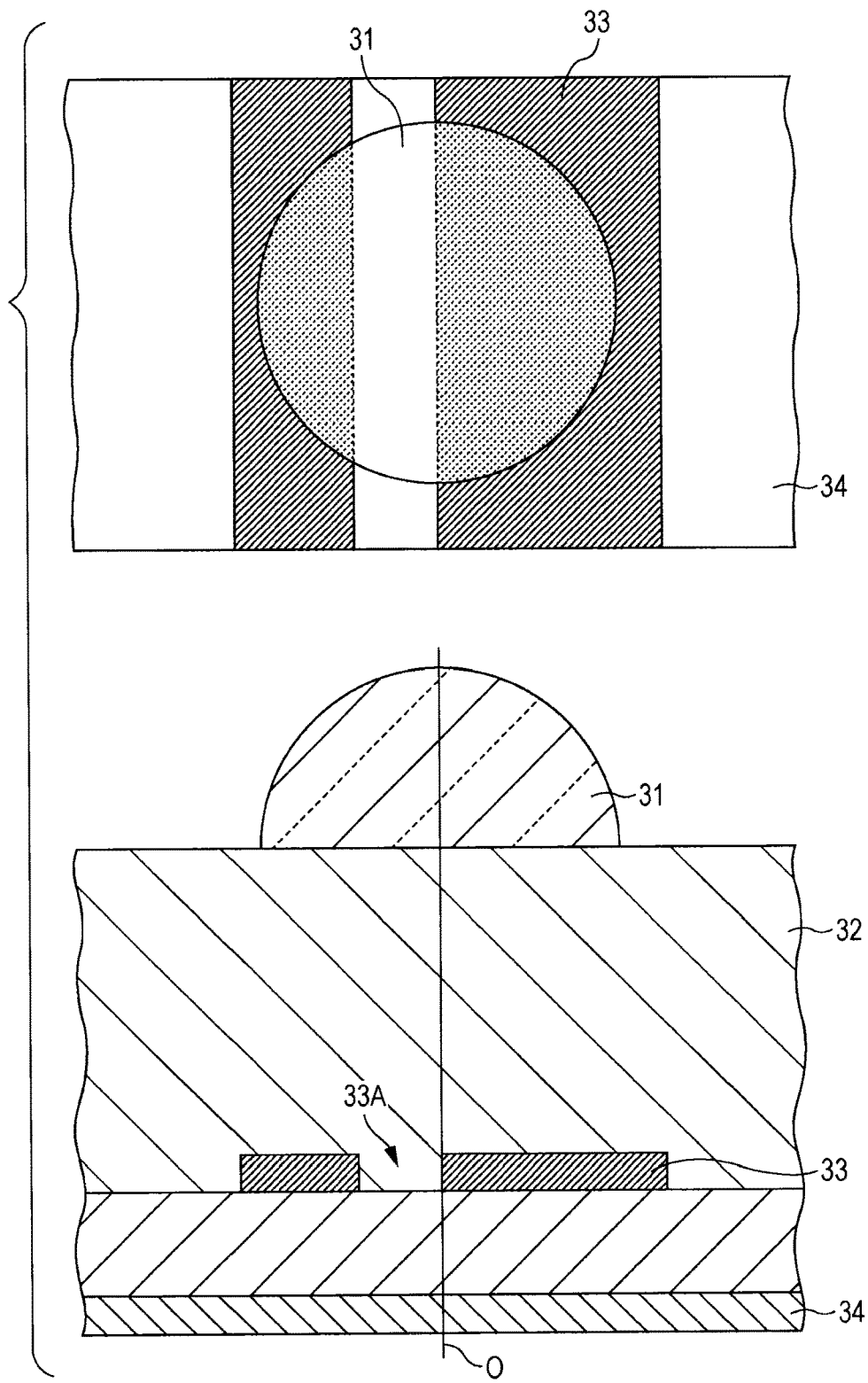
FIG. 3 is a diagram illustrating the structure of a first focal point detection pixel.

FIG. 3 illustrates the structure of a first focal point detection pixel S1, the top part of FIG. 3 illustrates a view of the first focal point detection pixel S1 from above, and the bottom part illustrates a cross-section of the first focal point detection pixel S1.

A micro lens 31 is formed on the side of the first focal point detection pixel S1 on which light is incident. Reference numeral 32 is a smoothing layer which configures a smooth surface for forming the micro lens 31, has high transmittance, and incident light passes through with low refraction. Reference numeral 34 is the photoelectric conversion region of the first focal point detection pixel S1, and converts incident light into an electrical signal corresponding to the amount of incident light. Reference numeral 33 is a light shielding layer, and includes a diaphragm opening portion 33A which is biased in one direction in relation to a center O of the photoelectric conversion region 34 of the first focal point detection pixel S1.

FIG. 4 illustrates the structure of the second focal point detection pixel S2, the top part FIG. 4 illustrates a view of the second focal point detection pixel S2 from above, and the bottom part illustrates a cross-section of the second focal point detection pixel S2.

A micro lens 41 is formed on the side of the second focal point detection pixel S2 on which light is incident. Reference numeral 42 is a smoothing layer which configures a smooth surface for forming the micro lens 41, has high transmittance, and incident light passes through with low refraction. Reference numeral 44 is the photoelectric conversion region of the second focal point detection pixel S2, and converts incident light into an electrical signal corresponding to the amount of incident light. Reference numeral 43 is a light shielding layer, and includes a diaphragm opening portion 43A which is biased in one direction in relation to the center O of the photoelectric conversion region 44 of the second focal point detection pixel S2. The diaphragm opening portion 43A is biased in the opposite direction from the diaphragm opening portion 33A of the first focal point detection pixel S1.

According to the structure illustrated in FIGS. 3 and 4, comparing a case in which the imaging optical system is viewed from the first focal point detection pixel S1 with a case in which the imaging optical system is viewed from the second focal point detection pixel S2 is equivalent to the pupil of the imaging optical system being symmetrically split.

In a state in which the imaging optical system is focused on the object, the outputs (image signals) obtained from each of the first focal point detection pixel row 201 and the second focal point detection pixel row 202 match each other.

In contrast, when the imaging optical system is not focused, there is a phase difference in the image signals obtained from each of the first focal point detection pixel row 201 and the second focal point detection pixel row 202. The direction of the phase difference is reversed between a front focus state and a rear focus state.

Figure 5:
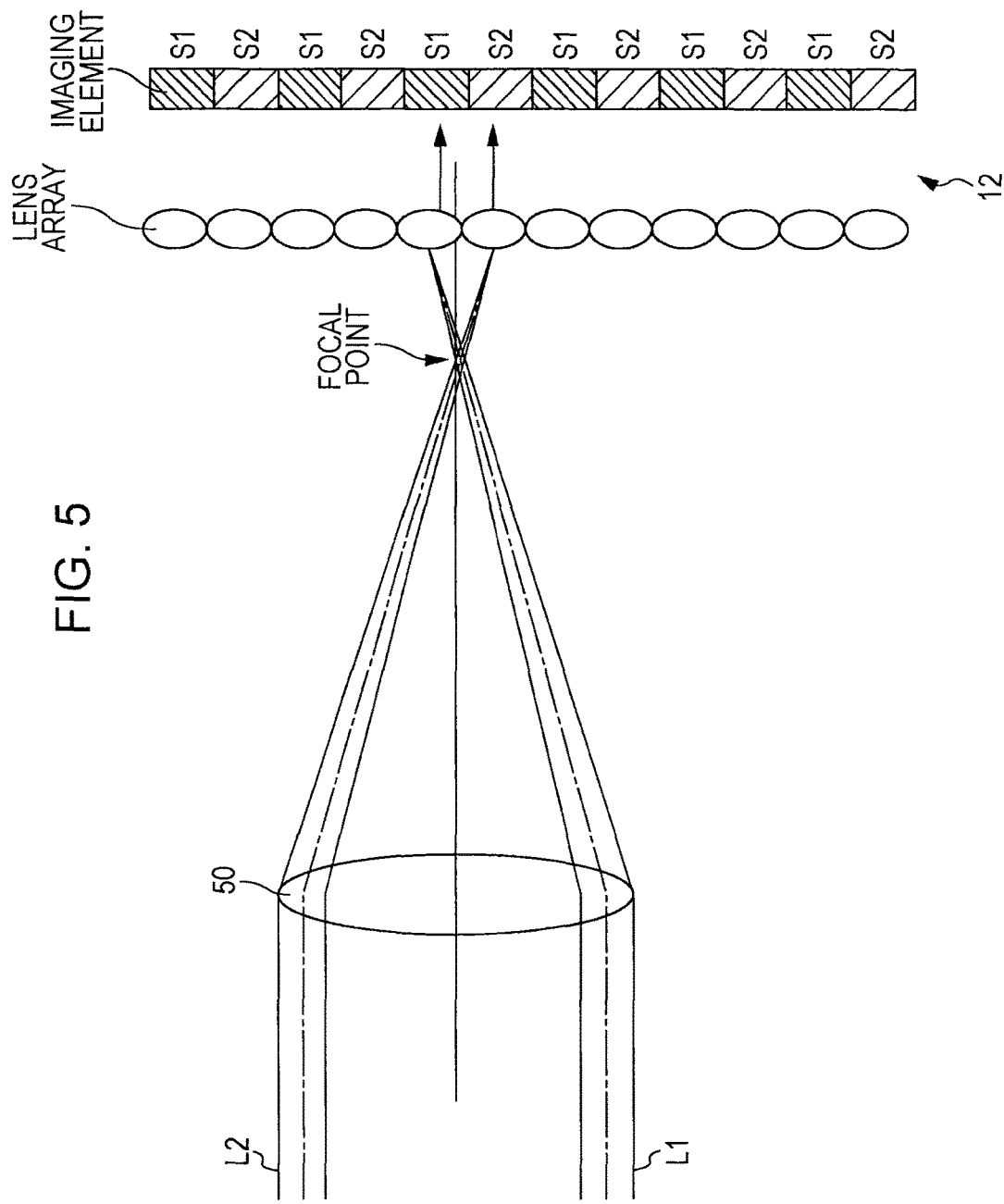
FIG. 5 is a diagram for explaining the relationship between a focus state and a phase difference in the imaging element.

An explanation will be given of the relationship between the focus state and the phase difference in the imaging element illustrated in FIGS. 2 to 4 with reference to FIGS. 5 and 6. However, the first focal point detection pixel S1 and the second focal point detection pixel S2 which are arranged on the imaging surface distanced from each other (refer to FIG. 2), in order to simplify the drawings, are depicted adjacent to each other, and the pixels other than the focal point detection pixels S1 and S2 are omitted in FIGS. 5 and 6.

A lens array is arranged on the front surface of the imaging surface of the imaging element to be distanced from the focal surface of the imaging lens in the optical axis direction. The lens array is configured by arranging micro lenses alternately on a two-dimensional plane. It is assumed that one micro lens is arranged in relation to each pixel.

The luminous flux from a specific point on the object is split into a luminous flux L1 using a split pupil corresponding to the first focal point detection pixel S1 and a luminous flux L2 using a split pupil corresponding to the second focal point detection pixel S2. The luminous flux L1 is incident on the first focal point detection pixel S1, the luminous flux L2 is incident on the second focal point detection pixel S2, and the two luminous flux are incident from the same point on the object. Therefore, in a state in which the imaging optical system is focused, as illustrated in FIG. 5, each of the luminous flux L1 and L2 passes through the micro lens corresponding to each of the pixels S1 and S2, respectively, and reaches a single point on the imaging element. In this case, the image signals Obtained from a row containing the first focal point detection pixels S1 and a row containing the second focal point detection pixels S2 match.

Figure 6:
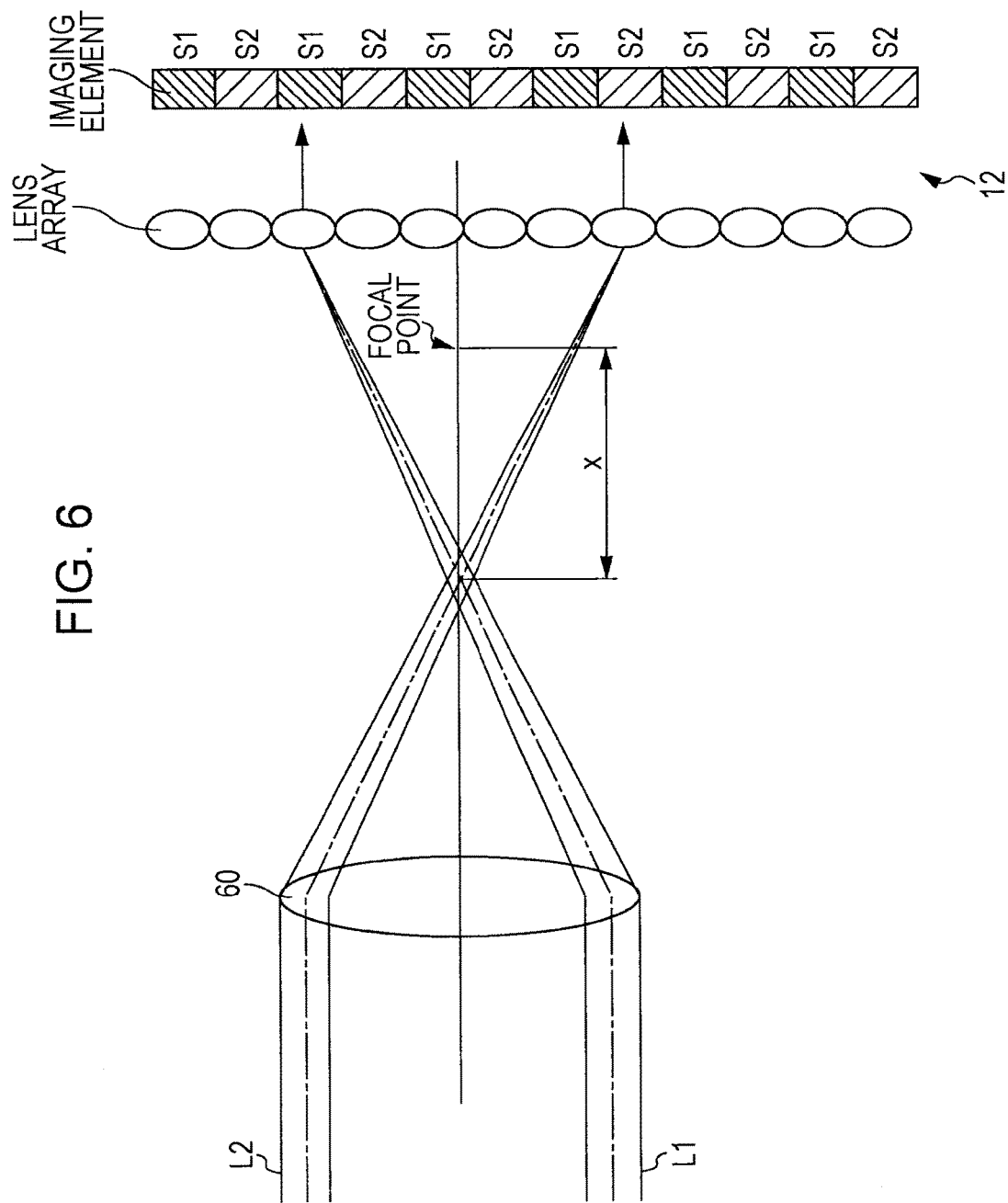
FIG. 6 is a diagram for explaining the relationship between the focus state and the phase difference in the imaging element.

Meanwhile, as illustrated in FIG. 6, in a state in which the focus is out by x, the destination positions of the luminous flux L1 and L2 are shifted from each other by the amount of change in the angle of incidence of the luminous flux L1 and 12 on the micro lenses. As a result, there is a phase difference in the image signals obtained from each of the rows containing the first focal point detection pixels S1 and the rows containing the second focal point detection pixels S2.

By using the principle described above, the phase difference signal 101 is output from the phase difference detection unit 11 of FIG. 1.

In relation to the input, image 100, the phase difference detection unit 11 detects the phase difference signal 101 using the first focal point detection pixels S1 and the second focal point detection pixels S2 within an image that is subjected to photoelectric conversion in the imaging element formed of a Bayer array such as the one illustrated in FIG. 2. The lens control unit 12 performs the focal point matching by causing an imaging lens 50 of FIG. 5 or an imaging lens 60 of FIG. 6 to move forward and backward in the optical axis direction according to the phase difference signal 101. For example, as a result of performing the focusing using lens control after detecting that there is a phase difference and the imaging optical system is not focused as illustrated in FIG. 6, the imaging optical system becomes focused as illustrated in FIG. 5.

When the focal point matching is completed, the lens control unit 12 outputs a control signal 102 to the imaging unit 13 in order to notify the imaging unit 13 that the focal point matching is completed. In relation to the input image 100, the imaging unit 13 outputs an image that is subjected to photoelectric conversion by the imaging element (R, G, B) for imaging the object image of the pixels of the Bayer array illustrated in FIG. 2 other than the focal point detection pixels S1 and S2.

Here, 103 is an image that is subjected to photoelectric conversion at a high exposure, 104 is an image that is subjected to photoelectric conversion at a low exposure, and description will be given hereinafter of the manner in which the images are generated.

Description will be given of the manner in which the photoelectric conversion is performed while controlling the exposure using the imaging element for imaging the object image with reference to FIGS. 7 and 8.

Figure 7:
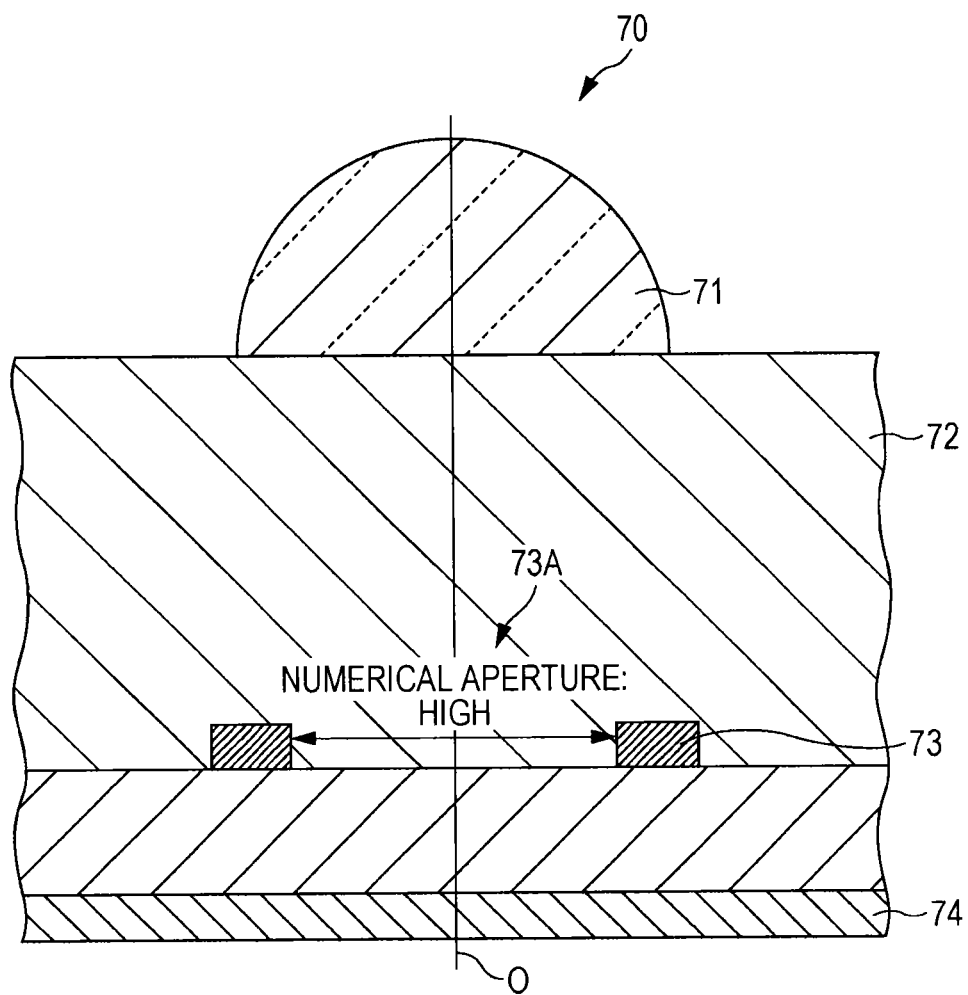
FIG. 7 is a diagram illustrating a state in which photoelectric conversion is performed at a high exposure by an object imaging pixel.

FIG. 7 illustrates a state in which the photoelectric conversion is performed at a high exposure by an object imaging pixel 70. The ray that is incident via a micro lens 71 reaches a light shielding layer 73 after passing through a smoothing layer 72. Here, the diaphragm is determined according to the numerical aperture of the diaphragm opening portion 73A, and, as illustrated, the numerical aperture is controlled to be high in the case of high exposure.

Figure 8:
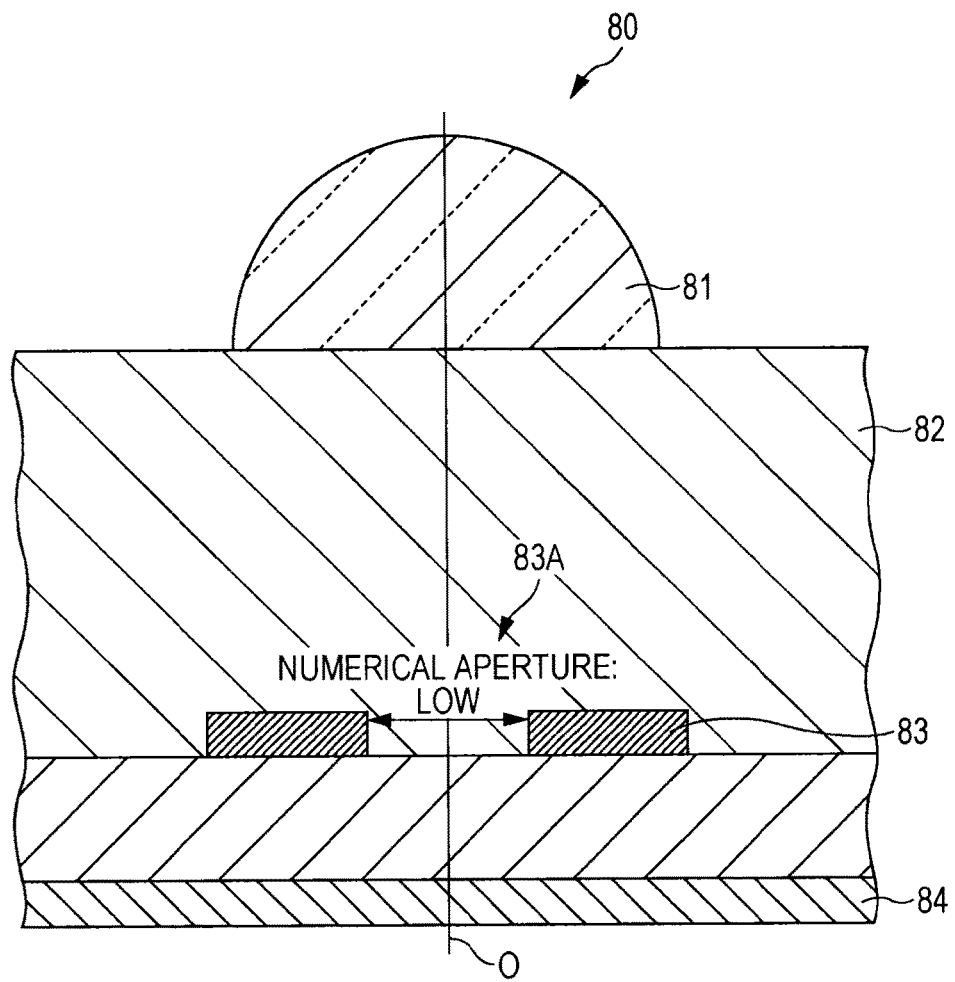
FIG. 8 is a diagram illustrating a state in which photoelectric conversion is performed at a low exposure by an object imaging pixel.

FIG. 8 illustrates a state in which photoelectric conversion is performed at a low exposure by an object imaging pixel 80. The ray that is incident via a micro lens 81 reaches a light shielding layer 83 after passing through a smoothing layer 82. Here, the diaphragm is determined according to the numerical aperture of the diaphragm opening portion 83A, and, as illustrated, the numerical aperture is controlled to be low in the case of low exposure.

According to the operations described above, it is possible to control the exposure during the photoelectric conversion in pixel units of the imaging element. As a result, the imaging unit 13 outputs, in one imaging, one frame including the high exposure image signal 103 and the low exposure image signal 104.

The image synthesizing unit 14 combines the high exposure image signal 103 and the low exposure image signal 104, and generates and outputs the HDR image 105 in one frame, that is, in one imaging. The generated HDR image 105 is an image without clipped whites or clipped blacks.

Note that, there are already several methods used in the field for generating a high dynamic range image by combining a plurality of images with different exposure properties, and the method of synthesizing the HDR image in the image synthesizing unit 14 is not particularly limited. Generally, there is a method in which image processing is carried out to raise the dynamic range of the entire image while reducing white clipping in a high exposure image and solving black clipping in a low exposure image.

Note that, since the focal point detection pixels S1 and S2 have different photoelectric properties from the pixels of the R, G, and B positions, the focal point detection pixels S1 and S2 may not be used for imaging the object. Therefore, as can be understood from FIG. 2, the information of the pixels of portions of the focal point detection pixels S1 and S2 is missing from within the imaged frame.

In the example illustrated in FIG. 2, within the Bayer array, the portion of the G component detection pixels is replaced with the focal point detection pixel S1 and S2. Therefore, a method of compensating the information of the pixels of the focal point detection pixels S1 and S2 from the information of the peripheral G pixels may be conceived.

Since the one frame image that is output from the imaging unit 13 includes the high exposure pixel signals and the low exposure pixel signals, the dynamic range is improved. However, the high exposure image and the low exposure image that are contained in one frame are both reduced to images of half the resolution of the original image.

Figure 9:
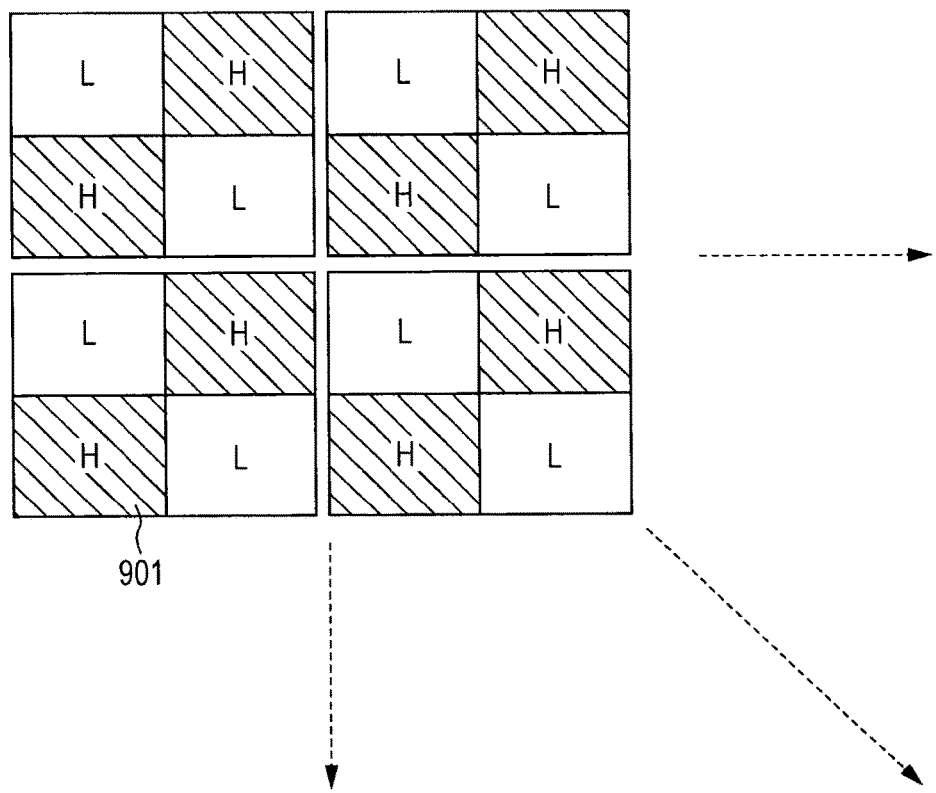
FIG. 9 is a diagram exemplifying an image in which a high exposure image and a low exposure image are captured at the same time.

FIG. 9 exemplifies an image in which the high exposure image and the low exposure image are captured in one frame 901 by the imaging unit 13. Since one frame includes the high exposure pixel signals and the low exposure pixel signals, the dynamic range is improved. However, it can be ascertained from FIG. 9 that the high exposure image and the low exposure image that are contained in one frame are both reduced to images of half the resolution of the original image. This is the reason that, while the dynamic range is improved, the resolution is reduced.

Figure 10:
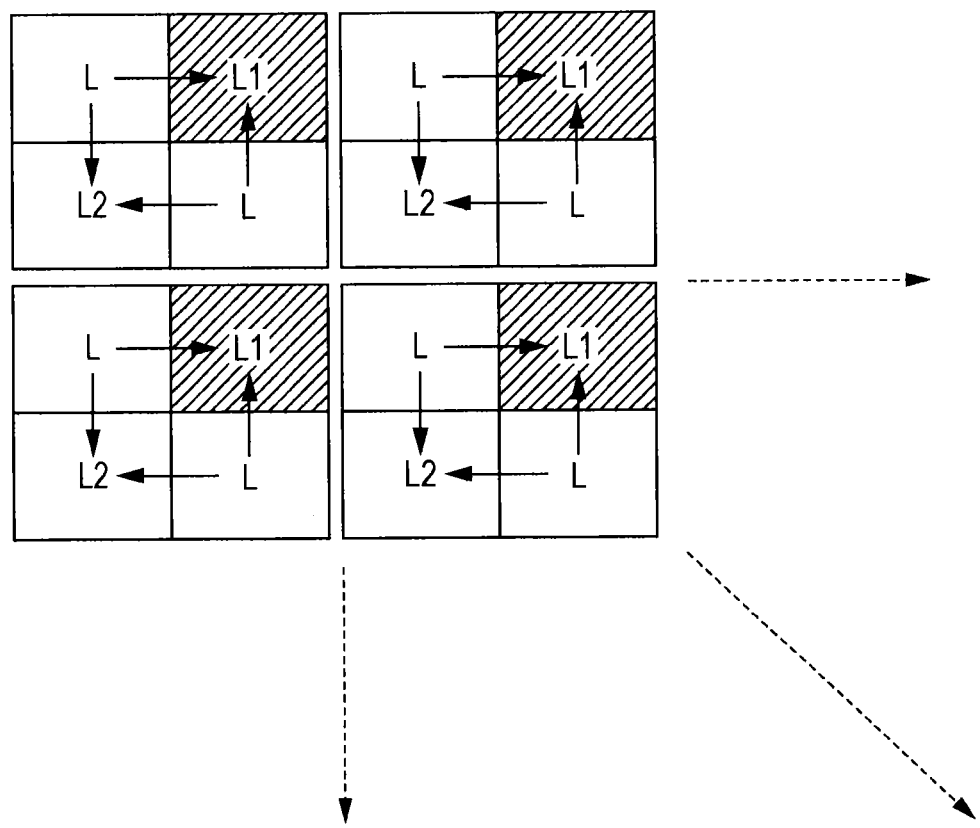
FIG. 10 is a diagram illustrating a state in which L component pixels are subjected to interpolation processing.

Therefore, in relation to the image that is output from the imaging element, new L component pixels L1 and L2 are generated in the positions in which the H component pixels are originally situated by subjecting adjacent L component pixels to interpolation processing (for example, mean value calculation). Accordingly, while the L component pixels are not actually present, since the values of adjacent pixels are often similar, the compensating effect is great, and it is possible to maintain the original resolution of the input image using the interpolation processing. FIG. 10 illustrates a state in which L component pixels are subjected to interpolation processing.

Figure 11:
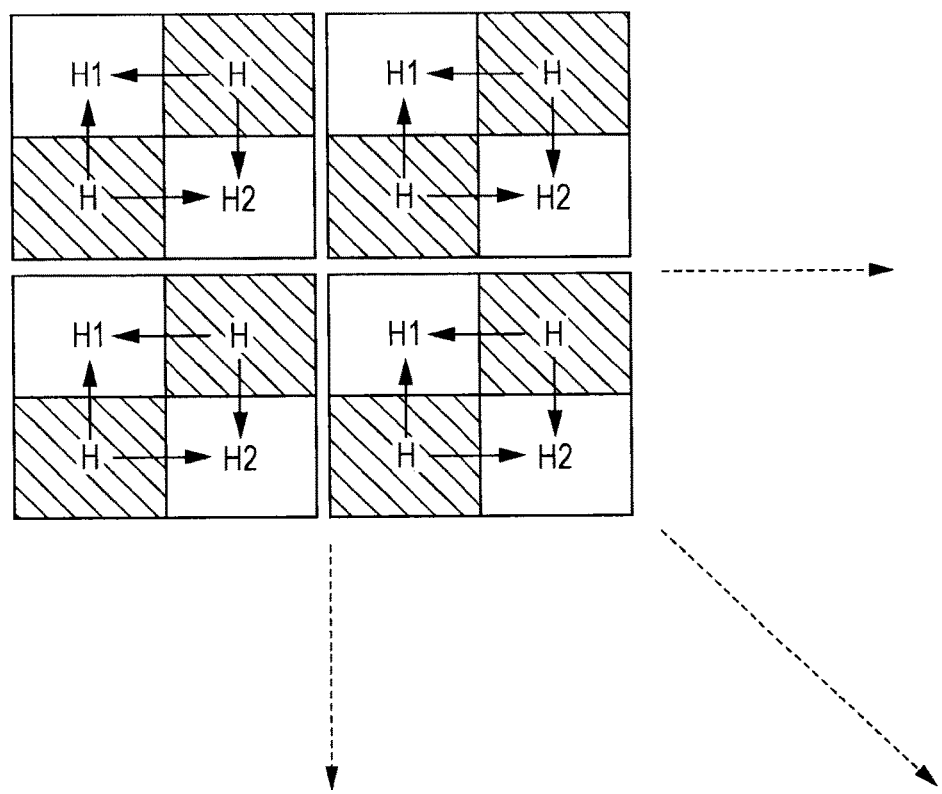
FIG. 11 is a diagram illustrating a state in which H component pixels are subjected to interpolation processing.

Similarly for the H component pixels, as illustrated in FIG. 11, new H component pixels H1 and H2 are generated in the positions in which the L component pixels are originally situated by subjecting adjacent H component pixels to interpolation processing (for example, mean value calculation). Accordingly, while the H component pixels are not actually present, since the values of adjacent pixels are often similar, the compensating effect is great, and it is possible to maintain the original resolution of the input image using the interpolation processing.

Figure 12:
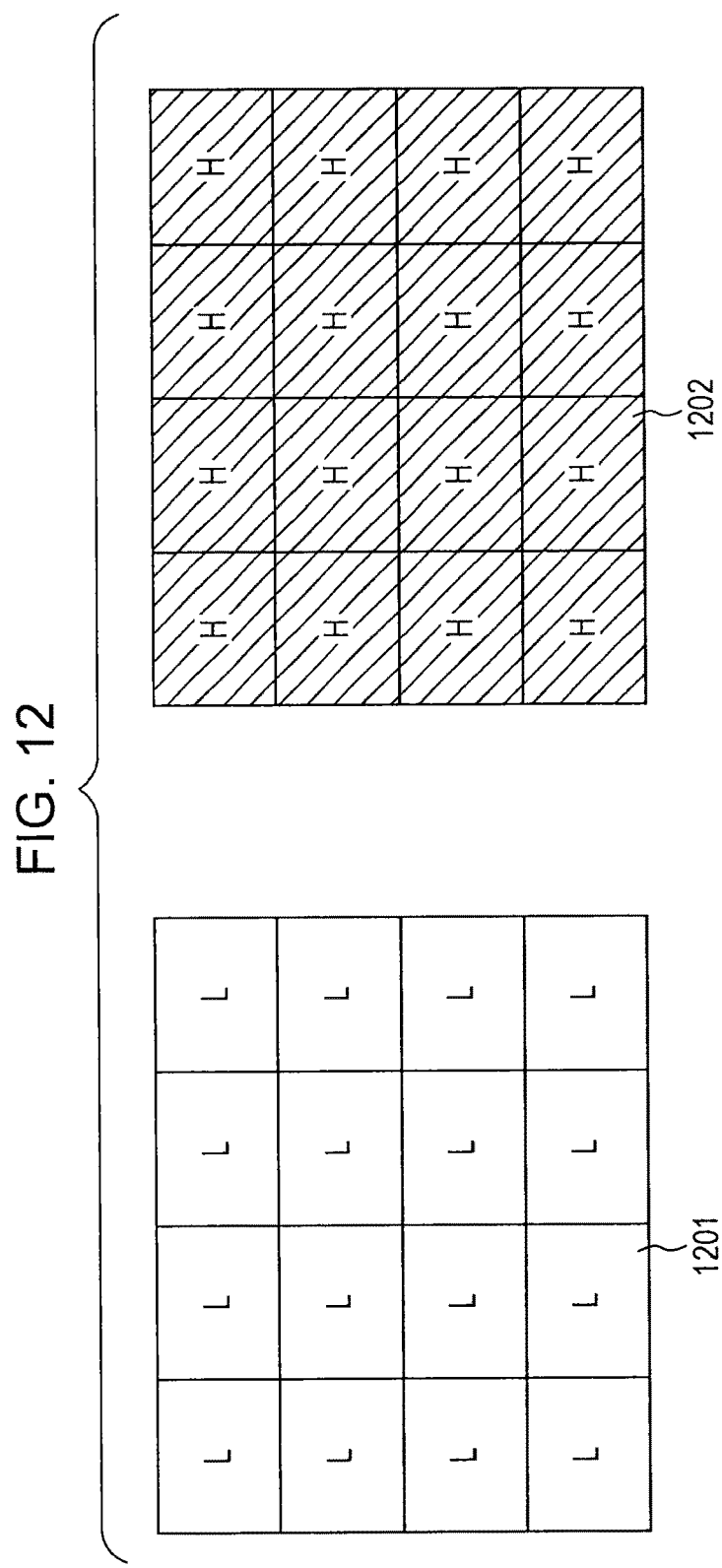
FIG. 12 is a diagram illustrating a state in which both the L component pixels and the H component pixels are subjected to interpolation processing, and an L component image and an H component image are generated, each having the same resolution as the original image.

As illustrated in FIGS. 10 and 11, when both the L component pixels and the H component pixels are subjected to interpolation processing in which adjacent pixels of the same component are interpolated in the positions of the other component pixels, as illustrated in FIG. 12, an L component image 1201 and an H component image 1202 are generated, each having the same resolution as the original image.

The image synthesizing unit 14 is capable of generating a high dynamic range image without clipped whites or clipped blacks by combining the two images 1201 and 1202. However, there are already several methods used in the field for generating a high dynamic range image by combining a plurality of images with different exposure properties, and the present technology disclosed in the present specification is riot limited to a particular method. Generally, there is a method in which image processing is carried out to raise the dynamic range of the entire image while reducing white clipping in a high exposure image and solving black clipping in a low exposure image.

FIGS. 7 and 8 illustrate examples in which the photoelectric conversion is performed at a high exposure by an object imaging pixel, and in which photoelectric conversion is performed at a low exposure by an object imaging pixel. The imaging unit 13 is capable of outputting one frame including a medium exposure image signal in addition to the high exposure image signal and the low exposure image signal by performing the photoelectric conversion at a medium exposure.

Figure 13:
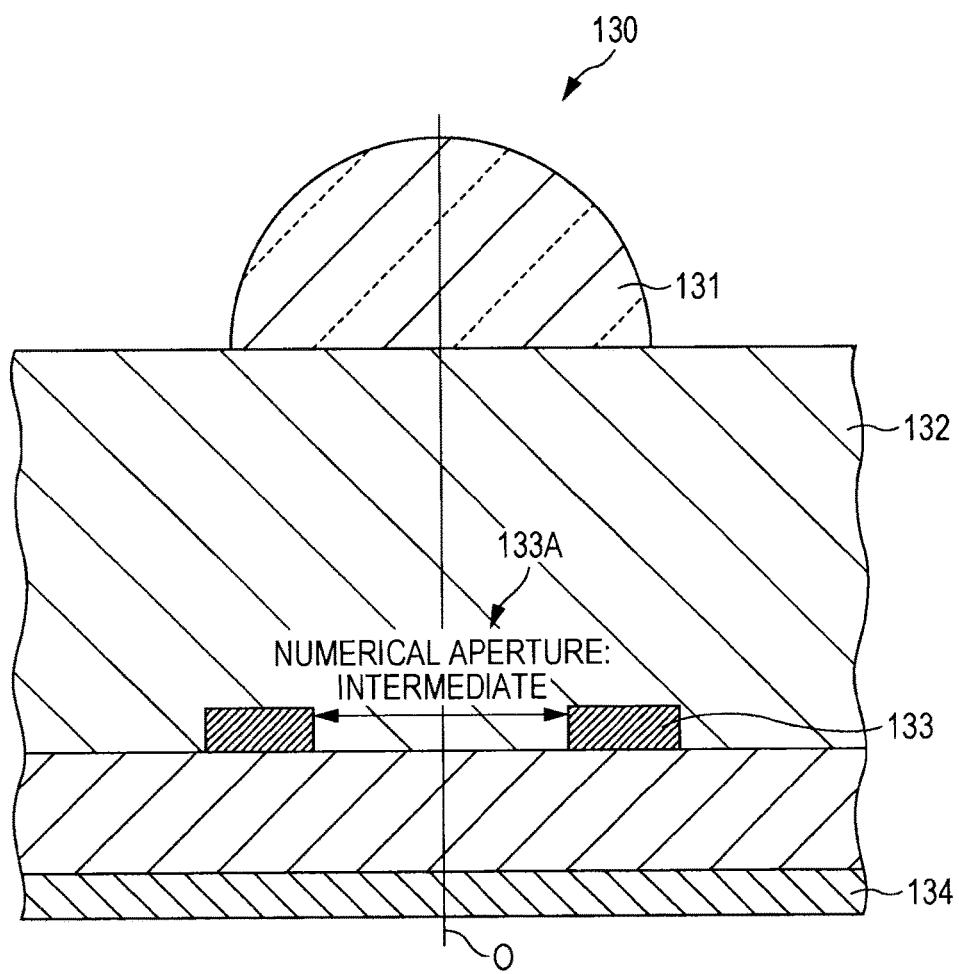
FIG. 13 is a diagram illustrating a state in which photoelectric conversion is performed at a medium exposure by the object imaging pixel.

FIG. 13 illustrates a state in which photoelectric conversion is performed at a medium exposure by the object imaging pixel 130. The ray that is incident via a micro lens 131 reaches a light shielding layer 133 after passing through a smoothing layer 132. Here, the diaphragm is determined according to the numerical aperture of the diaphragm opening portion 133A, and, as illustrated, the numerical aperture is controlled to be intermediate in the case of medium exposure.

In this case, the image synthesizing unit 14 combines the medium exposure image signal in addition to the high exposure image signal and the low exposure image signal, can generate a high dynamic range image.

Figure 14:
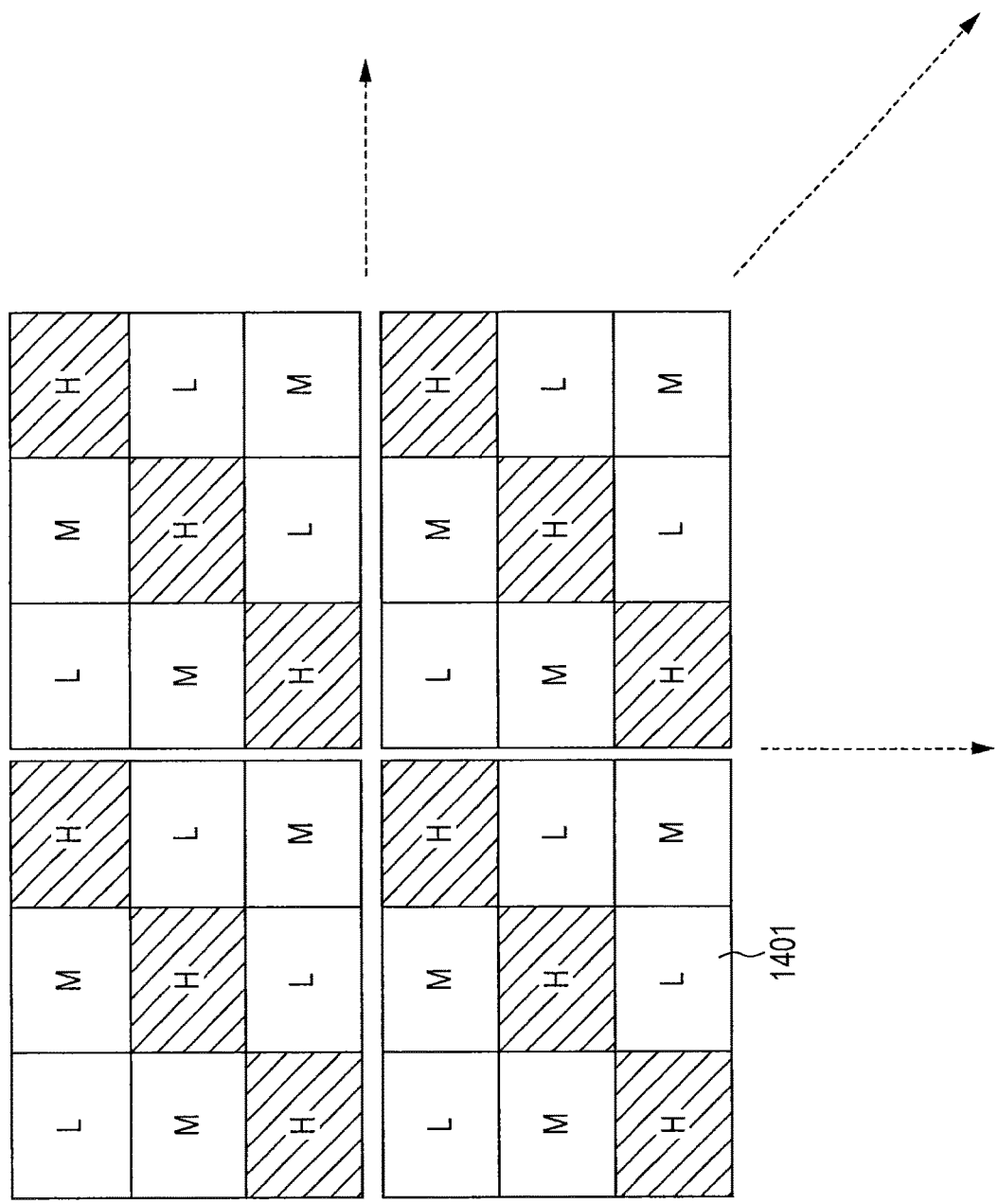
FIG. 14 is a diagram exemplifying an image in which a high exposure image, a medium exposure image, and a low exposure image are captured at the same time.

FIG. 14 exemplifies an image in which the high exposure image, the medium exposure image, and the low exposure image are captured at the same time in one frame 1401 by the imaging unit 13. Since one frame includes the high exposure pixel signals, the medium exposure pixel signals, and the low exposure pixel signals, the dynamic range is further improved. in comparison to the case illustrated in FIG. 9. However, it can be ascertained from FIG. 14 that the high exposure image, the medium exposure image, and the low exposure image that are contained in one frame are all reduced to images of a third of the resolution of the original image. This is the reason that, while the dynamic range is improved, the resolution is reduced.

Figure 15:
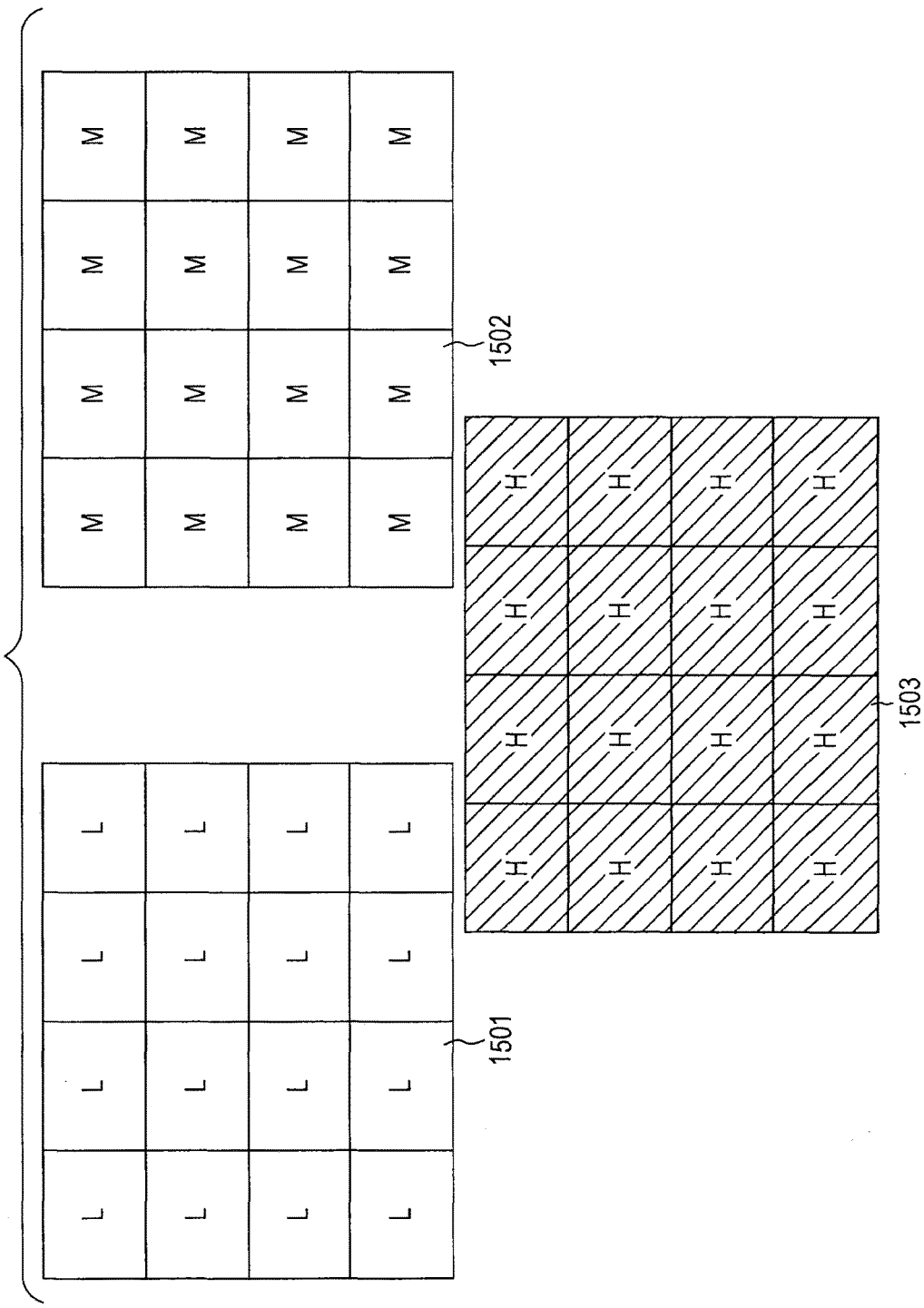
FIG. 15 is a diagram illustrating a state in which each of the L component pixels, the M component pixels, and the H component pixels are subjected to interpolation processing, and an L component image, an M component image, and an H component image are generated, each having the same resolution as the original image.

Therefore, in relation to the image, each of the L component pixels, the M component pixels, and the H component pixels are subjected to interpolation processing in which adjacent pixels of the same component are interpolated in the positions of the other component pixels. Accordingly, while the other component pixels are not actually present, since the values of adjacent pixels are often similar, the compensating effect is great, and it is possible to maintain the original resolution of the input image using the interpolation processing. FIG. 15 illustrates a state in which each of the L component pixels, the M component pixels, and the H component pixels are subjected to interpolation processing, and an L component image 1501, an M component image 1502, and an H component image 1503 are generated, each having the same resolution as the original image.

The image synthesizing unit 14 is capable of generating an image with a higher dynamic range without clipped whites or clipped blacks by combining the three images 1501, 1502, and 1503. However, there are already several methods used in the field for generating a high dynamic range image by combining a plurality of images with different exposure properties, and the present technology disclosed in the present specification is riot limited to a particular method.

As described above, according to the present embodiment, since the generation of the high dynamic range image is performed within one frame using the pixels for imaging the object image at the same time while performing the focal point matching using the pixels for focal point detection that are embedded in the imaging element, in comparison to the method in which the high dynamic range image is generated using a plurality of frames, there is an effect of reducing the hardware cost since it is possible to save on frame memory. Since the processing is completed within one frame, there is also an effect of being able to reduce the delay time.

Note that, the present technology disclosed in the present specification may be configured as described below.

(1) An imaging device, including an imaging lens; an imaging element which contains object imaging pixels and focal point detection pixels; and a lens array configured by micro lenses being arranged on a two-dimensional plane, and arranged on a front surface of an imaging surface of the imaging element to be distanced therefrom.

(2) The imaging device according to (1), further including a phase difference detection unit which detects a phase difference in signals obtained from each of a first focal point detection pixel and a second focal point detection pixel contained in the focal point detection pixels; and a lens control unit which controls a focal position of the imaging lens based on the phase difference.

(3) The imaging device according to (1), further including diaphragm opening portions which control an amount of light incident on the object imaging pixels.

(4) The imaging device according to any one of (1) to (3), in which the imaging device generates a plurality of images with different exposure conditions by controlling exposure for each object imaging pixel.

(5) The imaging device according to (4), further including an image synthesizing unit which generates a high dynamic range image by combining the plurality of images with different exposure conditions.

(6) The imaging device according to (5), in which the image synthesizing unit generates a high dynamic range image by combining a high exposure image and a low exposure image that are generated by the imaging element.

(7) The imaging device according to (5), in which the image synthesizing unit generates a high dynamic range image by combining a high exposure image, a medium exposure image, and a low exposure image that are generated by the imaging element.

(8) The imaging device according to (6) or (7), further including an interpolation unit which, after an image is formed on the imaging element, in relation to each image with different exposure conditions, improves a resolution thereof by interpolating pixels of pixel positions of other exposure conditions using adjacent pixel values in which the exposure conditions are the same.

(9) The imaging device according to (8), in which the interpolation unit increases a resolution to a same resolution as an input image by interpolating the pixels of each image with different exposure conditions.

(10) The imaging device according to any one of (1) to (9), in which the imaging device generates, using photoelectric conversion, a plurality of images with different exposure conditions using the object imaging pixels according to a focal position that is detected by the focal point detection pixels, and generates a high dynamic range image by combining the plurality of images with different exposure conditions.

It should be understood by those skilled in the art that various modifications, combinations, sub-combinations and alterations may occur depending on design requirements and other factors insofar as they are within the scope of the appended claims or the equivalents thereof.

What is claimed is:
1. An imaging device, comprising:
an imaging lens;
an imaging element which contains object imaging pixels and focal point detection pixels;
a lens array configured by micro lenses being arranged on a two-dimensional plane, and arranged in front of the imaging element; and
circuitry configured to:
detect a phase difference in signals obtained from each of a first focal point detection pixel and a second focal point detection pixel included in the focal point detection pixels,
control a focal position of the imaging lens based on the phase difference,
generate, using photoelectric conversion, a plurality of images with different exposure conditions using the object imaging pixels according to a focal position that is detected by the focal point detection pixels, and
generate a high dynamic range image by combining the plurality of images with the different exposure conditions,
wherein the first focal point detection pixel is positioned behind a different micro lens than the second focal point detection pixel, wherein the first focal point detection pixel and the second focal point detection pixel are differently configured focal point detection pixels, and wherein the different configuration of the first focal point detection pixel and the second focal point detection pixel includes different photoelectric detection properties.

2. The imaging device according to claim 1, wherein the imaging element further includes diaphragm opening portions which control an amount of light incident on the object imaging pixels.

3. The imaging device according to claim 1,
wherein the circuitry is further configured to generate the plurality of images with the different exposure conditions by controlling exposure for each object imaging pixel.

4. The imaging device according to claim 3,
wherein the circuitry is further configured to generate the high dynamic range image by combining a high exposure image and a low exposure image that are generated by the imaging element.

5. The imaging device according to claim 3,
wherein the circuitry is further configured to generate the high dynamic range image by combining a high exposure image, a medium exposure image, and a low exposure image that are generated by the imaging element.

6. The imaging device according to claim 4, wherein the circuitry is further configured to, after an image is formed on the imaging element and in relation to each image with different exposure conditions, improve a resolution thereof by interpolating pixels of pixel positions of other exposure conditions using adjacent pixel values in which the exposure conditions are the same.

7. The imaging device according to claim 6,
wherein the circuitry is further configured to increase a resolution to a same resolution as an input image by interpolating the pixels of each image with different exposure conditions.

8. The imaging device according to claim 1, wherein the first focal point detection pixel has a first diaphragm biased in a first direction, and the second focal point detection pixel has a second diaphragm biased in a second direction different from the first direction.

9. The imaging device according to claim 1, wherein the circuitry is further configured to compensate for missing image information that is occupied by the first focal point detection pixel and the second focal point detection pixel.

10. The imaging device according to claim 1, wherein the first focal point detection pixel has a first diaphragm that includes an opening that overlaps the micro lens of the first focal point detection pixel at a first position, and the second focal point detection pixel has a second diaphragm that includes an opening that overlaps the different micro lens of the second focal point detection pixel at a second position, wherein the first position and the second position are located on opposite sides of a center line that passes through the different micro lenses of the first focal point detection pixel and the second focal point detection pixel.

11. An imaging method, comprising:
detecting, using circuitry, a phase difference in signals obtained from each of a first focal point detection pixel and a second focal point detection pixel included in focal point detection pixels of an imaging element which contains object imaging pixels and focal point detection pixels and which has a lens array configured by micro lenses being arranged on a two-dimensional plane arranged in front thereof;
controlling, using the circuitry, a focal position of an imaging lens based on the phase difference;
generating, using the circuitry and using photoelectric conversion, a plurality of images with different exposure conditions using the object imaging pixels according to a focal position that is detected by the focal point detection pixels; and
generating, using the circuitry, a high dynamic range image by combining the plurality of images with the different exposure conditions,
wherein the first focal point detection pixel is positioned behind a different micro lens than the second focal point detection pixel,
wherein the first focal point detection pixel and the second focal point detection pixel are differently configured focal point detection pixels, and
wherein the different configuration of the first focal point detection pixel and the second focal point detection pixel includes different photoelectric detection properties.

* * * * *